(12) United States Patent
Shin et al.

(10) Patent No.: US 8,136,052 B2
(45) Date of Patent: *Mar. 13, 2012

(54) TOUCH SCREEN DEVICE AND OPERATING METHOD THEREOF

(75) Inventors: Sang Hyun Shin, Seoul (KR); Ji Suk Chae, Seoul (KR); Ho Joo Park, Seoul (KR); Young Ho Ham, Yongin (KR); Kyung Hee Yoo, Seoul (KR); Ji Ae Kim, Seoul (KR); Yu Mi Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 576 days.

This patent is subject to a terminal disclaimer.

(21) Appl. No.: 11/785,405

(22) Filed: Apr. 17, 2007

(65) Prior Publication Data

US 2007/0277125 A1    Nov. 29, 2007

Related U.S. Application Data

(63) Continuation of application No. 11/646,613, filed on Dec. 28, 2006.

(30) Foreign Application Priority Data

May 24, 2006   (KR) .................. 10-2006-0046717

(51) Int. Cl.
  *G06F 13/00* (2006.01)
  *G06F 15/00* (2006.01)
(52) U.S. Cl. ........................................ 715/863; 715/835
(58) Field of Classification Search .................. 715/853, 715/854–855, 700, 763–765, 834–836, 769, 715/863, 815

See application file for complete search history.

(56) References Cited

U.S. PATENT DOCUMENTS

| | | | |
|---|---|---|---|
| 5,140,678 | A | 8/1992 | Torres |
| 5,191,645 | A | 3/1993 | Carlucci et al. |
| 5,495,566 | A | 2/1996 | Kwatinetz |
| 5,523,775 | A | 6/1996 | Capps |
| 5,526,011 | A | 6/1996 | Hix et al. |
| 5,548,705 | A | 8/1996 | Moran et al. |

(Continued)

FOREIGN PATENT DOCUMENTS

AU         2006330724         11/2006

(Continued)

OTHER PUBLICATIONS

European Search Report for EP 07 10 0400 dated Oct. 20, 2010.

(Continued)

*Primary Examiner* — Cao "Kevin" Nguyen

(74) *Attorney, Agent, or Firm* — KED & Associates, LLP

(57) ABSTRACT

A touch screen device and an operating method thereof are provided. The touch screen device is operated by touching a touch screen and moving a touch while the touch is maintained on the screen. A detector detects a touch point and a moving trajectory, and a controller selects a user command based on the detected touch point and moving trajectory. Then, when the user releases the touch, the controller executes the user command. User commands are classified and stored in a storage device and then executed by the controller based on operation modes associated with the device. A variety of user commands may be executed even though not all the menus are not displayed on the screen at once. Further, a user may cancel an erroneously entered user command quickly and easily.

18 Claims, 10 Drawing Sheets

U.S. PATENT DOCUMENTS

| | | |
|---|---|---|
| 5,559,944 A | 9/1996 | Ono |
| 5,570,113 A | 10/1996 | Zetts |
| 5,586,235 A | 12/1996 | Kauffman |
| 5,592,608 A | 1/1997 | Weber et al. |
| 5,596,699 A | 1/1997 | Driskell |
| 5,757,368 A | 5/1998 | Gerpheide et al. |
| 5,794,127 A | 8/1998 | Lansang |
| 5,796,406 A | 8/1998 | Shigematsu et al. |
| 5,821,936 A | 10/1998 | Shaffer et al. |
| 5,831,616 A | 11/1998 | Lee |
| 5,880,743 A | 3/1999 | Moran et al. |
| 5,903,267 A | 5/1999 | Fisher |
| 6,094,197 A | 7/2000 | Buxton et al. |
| 6,097,387 A | 8/2000 | Sciammarella et al. |
| 6,107,997 A | 8/2000 | Ure |
| 6,121,960 A | 9/2000 | Carroll et al. |
| 6,259,436 B1 * | 7/2001 | Moon et al. .................. 345/173 |
| 6,310,615 B1 | 10/2001 | Davis et al. |
| 6,334,003 B1 | 12/2001 | Yokota |
| 6,414,700 B1 | 7/2002 | Kurtenbach et al. |
| 6,433,801 B1 | 8/2002 | Moon et al. |
| 6,459,442 B1 | 10/2002 | Edwards et al. |
| 6,476,796 B1 | 11/2002 | Kuzunuki et al. |
| 6,525,749 B1 | 2/2003 | Moran et al. |
| 6,560,281 B1 | 5/2003 | Black et al. |
| 6,618,063 B1 | 9/2003 | Kurtenbach |
| 6,724,370 B2 | 4/2004 | Dutta et al. |
| 6,738,050 B2 | 5/2004 | Comiskey et al. |
| 6,753,892 B2 | 6/2004 | Chung |
| 6,765,557 B1 | 7/2004 | Segal et al. |
| 6,883,140 B1 | 4/2005 | Acker et al. |
| 6,883,145 B2 | 4/2005 | Jaeger |
| 6,900,835 B2 | 5/2005 | Cazier et al. |
| 6,915,492 B2 | 7/2005 | Kurtenbach et al. |
| 6,940,494 B2 | 9/2005 | Hoshino et al. |
| 6,957,395 B1 | 10/2005 | Jobs et al. |
| 6,958,749 B1 | 10/2005 | Matsushita et al. |
| 6,965,377 B2 | 11/2005 | Yanagisawa et al. |
| 7,015,932 B1 | 3/2006 | Koike et al. |
| 7,031,756 B1 | 4/2006 | Sim et al. |
| 7,035,720 B2 | 4/2006 | Taxis |
| 7,046,230 B2 | 5/2006 | Zadesky et al. |
| 7,047,503 B1 | 5/2006 | Parrish et al. |
| 7,158,913 B2 | 1/2007 | Park et al. |
| 7,162,685 B2 | 1/2007 | Saito |
| 7,164,410 B2 | 1/2007 | Kupka |
| 7,164,432 B1 | 1/2007 | Amemiya |
| 7,242,323 B2 | 7/2007 | Sato et al. |
| 7,345,671 B2 | 3/2008 | Robbin et al. |
| 7,348,967 B2 | 3/2008 | Zadesky et al. |
| 7,406,666 B2 * | 7/2008 | Davis et al. .................. 715/863 |
| 7,434,177 B1 | 10/2008 | Ording et al. |
| 7,456,823 B2 | 11/2008 | Poupyrev et al. |
| 7,469,388 B1 | 12/2008 | Baudisch et al. |
| 7,486,279 B2 | 2/2009 | Wong et al. |
| 7,509,588 B2 * | 3/2009 | Van Os et al. ................ 715/835 |
| 7,898,529 B2 | 3/2011 | Fitzmaurice et al. |
| 2001/0019374 A1 | 9/2001 | Izumi et al. |
| 2002/0011990 A1 | 1/2002 | Anwar |
| 2002/0015064 A1 | 2/2002 | Robotham et al. |
| 2002/0103616 A1 | 8/2002 | Park et al. |
| 2002/0149569 A1 | 10/2002 | Dutta et al. |
| 2002/0149605 A1 | 10/2002 | Grossman |
| 2003/0076306 A1 | 4/2003 | Zadesky et al. |
| 2003/0142123 A1 | 7/2003 | Malamud et al. |
| 2003/0174149 A1 | 9/2003 | Fujisaki et al. |
| 2003/0234772 A1 | 12/2003 | Zhang et al. |
| 2004/0056839 A1 * | 3/2004 | Yoshihara .................... 345/156 |
| 2004/0095395 A1 | 5/2004 | Kurtenbach |
| 2004/0100479 A1 | 5/2004 | Nakano et al. |
| 2005/0024322 A1 | 2/2005 | Kupka |
| 2005/0024341 A1 | 2/2005 | Gillespie et al. |
| 2005/0047629 A1 | 3/2005 | Farrell et al. |
| 2005/0176502 A1 * | 8/2005 | Nishimura et al. ............. 463/31 |
| 2005/0193017 A1 | 9/2005 | Kim |
| 2005/0193351 A1 | 9/2005 | Huoviala |
| 2005/0251748 A1 | 11/2005 | Gusmorino et al. |
| 2006/0013079 A1 | 1/2006 | Rekimoto |
| 2006/0026535 A1 | 2/2006 | Hotelling et al. |
| 2006/0026536 A1 * | 2/2006 | Hotelling et al. ............. 715/863 |
| 2006/0085767 A1 | 4/2006 | Hinckley et al. |
| 2006/0159279 A1 | 7/2006 | Kuo et al. |
| 2006/0256091 A1 | 11/2006 | Hino |
| 2006/0271947 A1 | 11/2006 | Lienhart et al. |
| 2007/0018968 A1 | 1/2007 | Iwamoto et al. |
| 2007/0030257 A1 | 2/2007 | Bhogal et al. |
| 2007/0033539 A1 | 2/2007 | Thielman et al. |
| 2007/0075980 A1 | 4/2007 | Hsieh et al. |
| 2007/0125860 A1 | 6/2007 | Lapstun et al. |
| 2007/0136690 A1 | 6/2007 | MacLaurin et al. |
| 2007/0146544 A1 | 6/2007 | Liu et al. |
| 2007/0150842 A1 | 6/2007 | Chaudhri et al. |
| 2007/0180392 A1 | 8/2007 | Russo |
| 2007/0273663 A1 | 11/2007 | Park et al. |
| 2008/0150905 A1 | 6/2008 | Grivna et al. |
| 2008/0282158 A1 | 11/2008 | Aaltonen et al. |
| 2009/0119613 A1 | 5/2009 | Nakaya |

FOREIGN PATENT DOCUMENTS

| | | |
|---|---|---|
| EP | 0 604 346 | 6/1994 |
| EP | 1 028 570 | 8/2000 |
| EP | 1 037 135 | 9/2000 |
| GB | 2329813 | 3/1999 |
| JP | 05-158616 | 6/1993 |
| JP | 2002041242 | 2/2002 |
| TW | 580636 | 3/2004 |
| TW | 580652 | 3/2004 |
| TW | 583552 | 4/2004 |
| TW | 200406734 | 5/2004 |
| TW | 200410853 | 7/2004 |
| TW | I236630 | 7/2005 |
| TW | M282290 | 12/2005 |
| WO | WO 00/38042 | 6/2000 |
| WO | WO 00/75766 | 12/2000 |
| WO | WO 2005/073954 | 8/2005 |

OTHER PUBLICATIONS

U.S. Office Action for U.S. Appl. No. 11/785,403 dated Jan. 7, 2010.
Office Action dated Nov. 13, 2009 for U.S. Appl. No. 11/646,613.
Office Action dated Oct. 20, 2009 for U.S. Appl. No. 11/646,604.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.
Office Action dated Dec. 4, 2009 for U.S. Appl. No. 11/785,401.
Indian Office Action dated Nov. 16, 2009.
U.S. Office Action issued in U.S. Appl. No. 11/646,613 dated Feb. 2, 2010, superceded by Office Action issued and Mar. 8, 2010.
U.S. Office Action issued in U.S. Appl. No. 11/785,400 dated Feb. 4, 2010.
U.S. Office Action issued in U.S. Appl. No. 11/646,586 dated Mar. 10, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
U.S. Office Action issued in U.S. Appl. No. 11/646,597 dated Mar. 8, 2010.
U.S. Office Action issued in U.S. Appl. No. 11/646,598 dated Feb. 26, 2010.
U.S. Office Action issued in U.S. Appl. No. 11/646,585 dated Mar. 18, 2010.
Taiwanese Office Action issued in TW Application No. 095147947 dated Dec. 29, 2009.
Article by Greg Scoblete, Sandisk Introduces Flash Drives, MP3 Players, TWICE, Jan. 20, 2006, 21, 3; Research Library, p. 4.
SanDisk Sana™ e200 User Guide.
U.S. Office Action issued in U.S. Appl. No. 11/785,404 dated Mar. 25, 2010.
U.S. Office Action issued in U.S. Appl. No. 11/785,399 dated Apr. 1, 2010.
Indian Office Action issued in Indian Application No. 101/MUM/2007 dated May 12, 2010.
Taiwanese Office Action in issued in TW Application No. 095147942 dated Jun. 8, 2010.

Taiwanese Office Action in issued in TW Application No. 095147085 dated Jun. 9, 2010.
Taiwanese Office Action in issued in TW Application No. 095147940 dated Jun. 15, 2010.
U.S. Office Action issued in U.S. Appl. No. 11/646,598 dated Aug. 2, 2010.
U.S. Office Action issued in U.S. Appl. No. 11/646,613 dated Aug. 4, 2010.
U.S. Office Action issued in U.S. Appl. No. 11/785,404 dated Sep. 1, 2010.
U.S. Final Office Action issued in U.S. Appl. No. 11/646,585 dated Sep. 16, 2010.
European Search Report issued in EP Application No. 07100272.9 dated Aug. 19, 2011.
U.S. Office Action issued in U.S. Appl. No. 11/785,404 dated Aug. 30, 2011.
U.S. Office Action issued in U.S. Appl. No. 12/368,379 dated Sep. 14, 2011.
U.S. Office Action issued in U.S. Appl. No. 11/785,403 dated Oct. 25, 2010.
Taiwanese Office Action issued in TW Application No. 95147944 dated Aug. 27, 2010 (English translation).
Final Office Action issued in U.S. Appl. No. 11/785,399 dated Nov. 16, 2010.
Office Action issued in U.S. Appl. No. 11/646,597 dated Dec. 21, 2010.
Supplemental Final Office Action issued in U.S. Appl. No. 11/785,399 dated Jan. 4, 2011.
Office Action issued in U.S. Appl. No. 11/646,613 dated Jan. 6, 2011.
Office Action issued in U.S. Appl. No. 11/646,585 dated Jan. 13, 2011.
Notice of Allowance issued in U.S. Appl. No. 11/646,598 dated Feb. 14, 2011.
U.S. Office Action issued in U.S. Appl. No. 11/785,404 dated Mar. 1, 2011.
U.S. Office Action issued in U.S. Appl. No. 11/646,613 dated Mar. 7, 2011.
U.S. Office Action issued in U.S. Appl. No. 11/785,399 dated Mar. 16, 2011.
U.S. Final Office Action issued in U.S. Appl. No. 11/646,597 dated May 19, 2011.
U.S. Office Action issued in U.S. Appl. No. 11/785,403 dated Jun. 22, 2011.
U.S. Final Office Action issued in U.S. Appl. No. 11/646,585 dated Jul. 21, 2011.

* cited by examiner

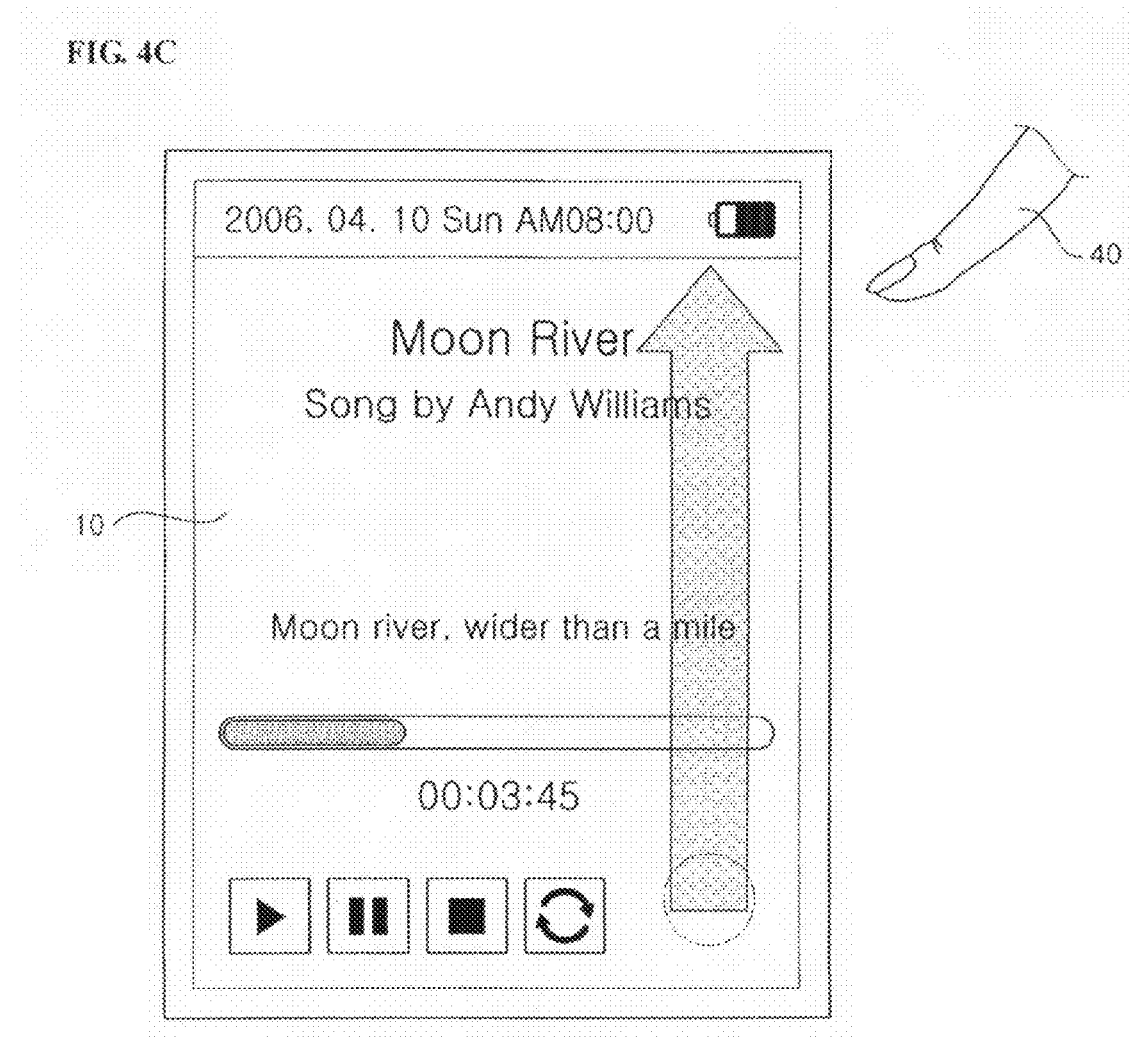

TOUCH SCREEN DEVICE AND OPERATING METHOD THEREOF

This is a Continuation Application of Ser. No. 11/646,613 filed on Dec. 28, 2006, which claims priority to Application Serial No. 10-2006-0046717 filed on May 24, 2006, which are incorporated herein by reference.

BACKGROUND

1. Field

A touch screen device and an operating method thereof are disclosed herein.

2. Background Art

Portable information terminals such as, for example, personal digital assistants (PDAs), portable multimedia players (PMPs), MP3 players, cellular phones and the like have become smaller in size. In these smaller terminals, touch screen methods may be employed in place of conventional key button input methods so that the touch screen device can function as both an information display unit and an input unit, allowing users to more easily select and input information and interface with a computer. If a user's finger or other such object comes into contact with a specific point displayed on the screen, a coordinate of the contacted point can be obtained, and a specific process corresponding to a menu of the selected coordinate is executed.

However, the aforementioned technique has the following problems.

As described above, to allow for selection and execution of a corresponding menu in a portable information terminal equipped with a touch screen, all the available menus should be displayed so that the menus can be viewed and directly touched. However, this makes the screen configuration complicated since all the menus are displayed on the screen at the same time.

Furthermore, once any icon(s) or file information displayed on the touch screen is selected, the selection cannot be cancelled. That is, once the icon or file information has been touched, there is no way to change or cancel the touching action until the touch is released. Therefore, if a user has selected a particular menu in error, the information corresponding to the selected menu is executed as the touch is released. Accordingly, the user must first initiate and then terminate the current execution action before returning again to a menu information list for selection of the intended menu.

Additionally, supplemental information is not provided when a specific menu is selected. Therefore, the user has only the menu information currently displayed on the screen available when making a selection.

BRIEF DESCRIPTION OF THE DRAWINGS

Embodiments will be described in detail with reference to the following drawings in which like reference numerals refer to like elements, wherein:

FIGS. 4A-4E illustrate operation of the touch screen device shown in FIGS. 1 and 2 in a playback mode, in accordance with an embodiment.

DETAILED DESCRIPTION

Hereinafter, a touch screen device and an operating method thereof in accordance with embodiments as embodied and broadly described herein will be described in detail with reference to the accompanying drawings.

Figure 1:
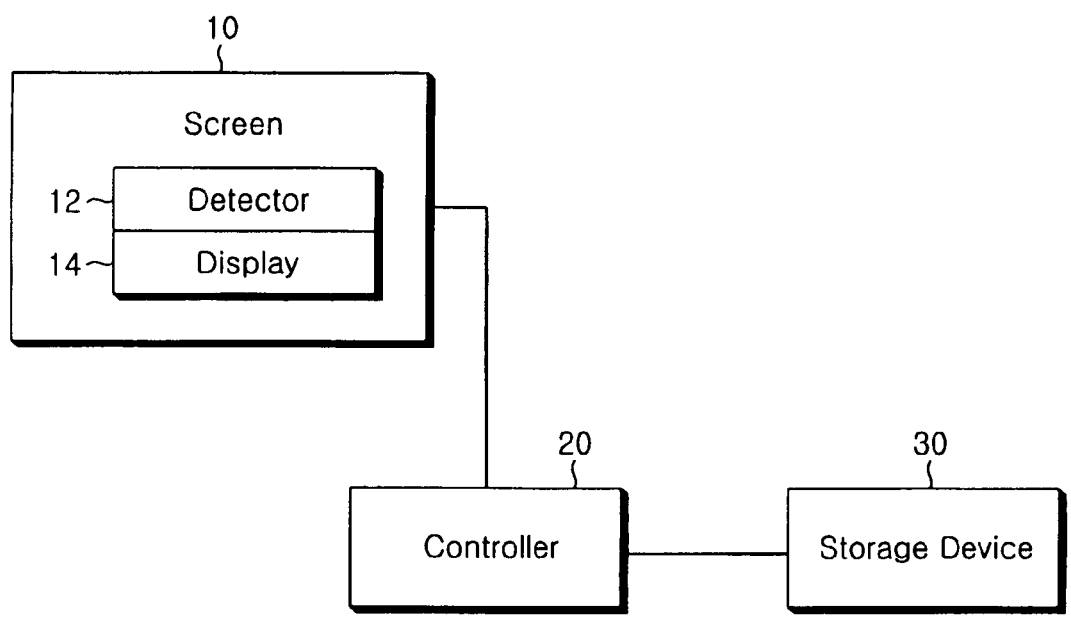
FIGS. 1 and 2 are block diagrams of a touch screen device, in accordance with embodiments.

As shown in FIG. 1, a touch screen device in accordance with an embodiment may include a screen 10 which allows information to be input and displayed. The screen 10 may include a display 14 which may display a variety of menu related information such as, for example, icons, data, and the like thereon. The screen 10 may also include a touch panel or detector 12 for detecting a touching action related to, for example, menu or data selection displayed on the display 14. When a user touches, or touches and moves (hereinafter, referred to as 'drags'), menus or data with a touching implement such as, for example, a finger 40, a stylus pen, or the like, to select the menus or data displayed on the screen 10, the detector 12 may detect the touching or dragging action on the screen 10.

The display 14 may be any type of general screen display device, including, but not limited to, display devices such as, for example, a liquid crystal display (LCD), plasma display panel (PDP), light emitting diode (LED) or organic light emitting diode (OLED). The detector 12 may be a thin layer provided on a front surface of the display 14, and may employ infrared rays, a resistive method, or a capacitive method.

In the case of a resistive touch screen, such a resistive touch screen may include two layers coated with resistive materials positioned at a constant interval, with electric currents supplied to both layers. If pressure is applied to one of the layers, causing that layer to come into contact with the other layer, an amount of electric current flowing along the layers is changed at the contact point, and a touched point is thus detected based on the change in electric current. In contrast, a capacitive touch screen may include a glass layer with both surfaces coated with conductive material. Electric voltage is applied to edges of the glass, causing high frequencies to flow along the surface of the touch screen. A high frequency waveform is distorted when pressure is applied to the surface of the touch screen. Thus, a touched point is detected by a change in the waveform.

The screen 10 shown in FIG. 1 may be connected to a controller 20. The controller 20 may access a user command corresponding to a selected menu as detected by the detector 12, or data, such as additional information or messages, from a storage device 30, and cause the command or data to be displayed on the screen 10. The controller 20 may also control the overall operation of the digital equipment in which it is installed. The controller 20 may operate the digital equipment according to the detection results of the detector 12.

The controller 20 may be connected to the storage device 30. The storage device 30 may store user commands defined in accordance with a particular touched point or a particular drag trajectory (hereinafter, referred to as a 'moving trajectory') to be executed by the controller 20. The storage device 30 may be divided based on modes of operation, and user commands may be stored corresponding to the touched points and moving trajectories. The touched points and the moving trajectories corresponding to the user commands may be defined by a user. That is, the user may assign or change touched points, moving trajectories, and released points corresponding to the respective user commands based on personal preference.

Figure 2:
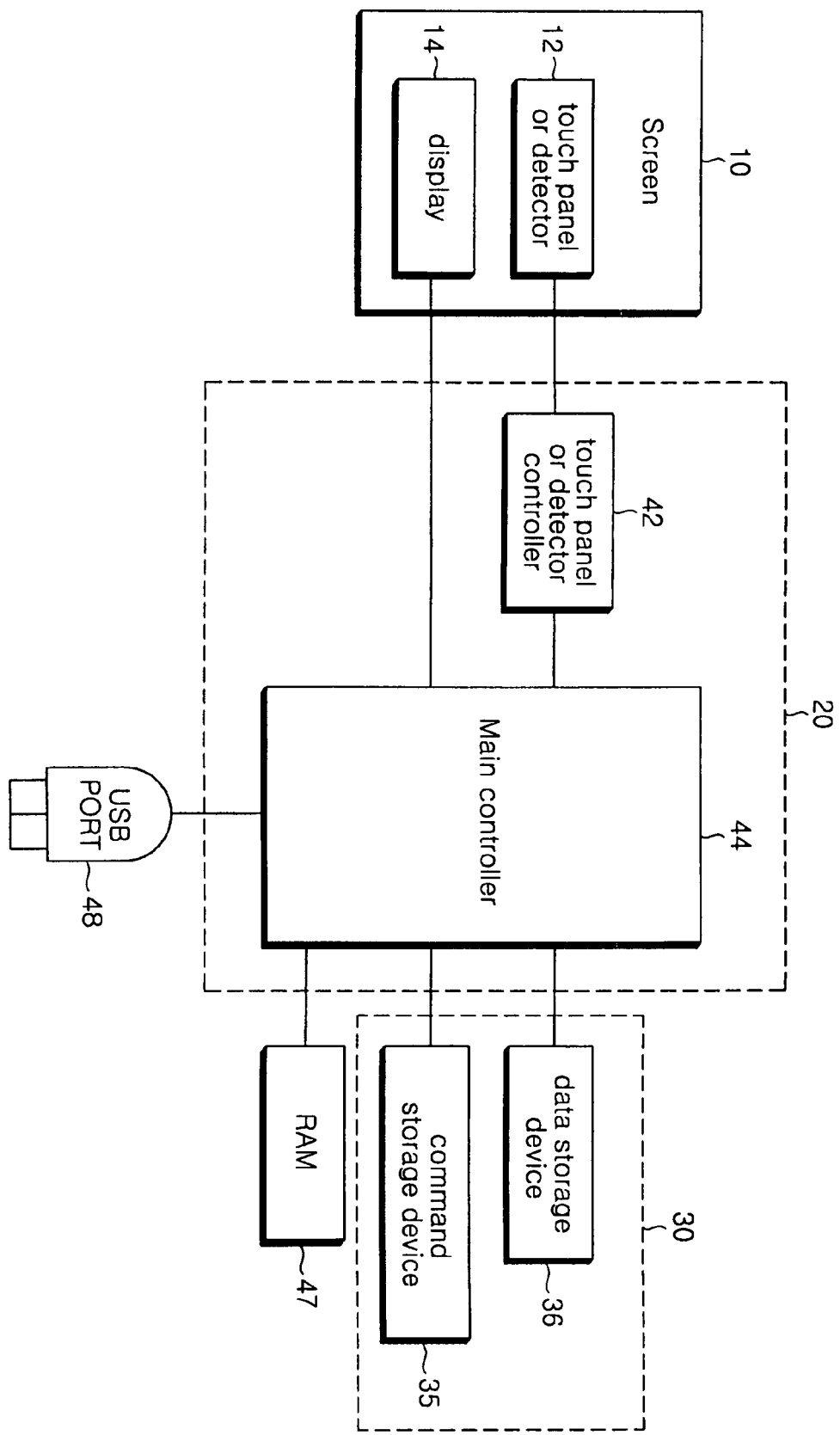

FIG. 2 is a block diagram which illustrates a touch screen device according to an embodiment in more detail. As shown in FIG. 2, the screen 10 may include a touch panel or detector 12 and a display 14. The display 14 may be, for example, a thin film transistor liquid crystal display (TFT-LCD), or another type of display, as appropriate.

The touch panel or detector 12 may be connected to a touch panel or detector controller 42 which may convert a touch detected on the touch panel or detector 12 into a corresponding signal. The touch panel or detector controller 42 may allow a change in an amount of electric current or high frequency waveform corresponding to an input position on the touch panel or detector 12 to be converted into a digital signal. The display 14 and the touch panel or detector controller 42 may be connected to a main controller 44 and each may operate under the control of the main controller 44. The main controller 44 may be configured such that a touch type can be detected by extracting a touch point and moving trajectory from digital signals input from the touch panel or detector controller 42, as described above.

A user command storage device 35 for storing information related to a user command based on a particular touch type may be connected to the main controller 44. The user command information stored in the user command storage device 35 may be classified by the operation mode and contain a user command for equipment corresponding to a specific touch type. Description images corresponding to the commands may also be stored in the user command storage device 35. The description images may be displayed to inform the user of the particular user command currently being executed.

Examples of touch types and corresponding user commands for a particular operation mode are shown in Table 1.

example, a NOR memory can provide better, more reliable and stable information may be advantageous.

An interface, such as, for example, a universal serial bus (USB) port 48 may be connected to the main controller 44 to provide an interface for modifying data. The USB port 48 may be connected to an external device such that user command information and data stored in the data storage device 36 may be updated, deleted, or otherwise modified as necessary. The main controller 44 may also have a random access memory (RAM) 47 for driving the display device. In certain embodiments, a synchronous dynamic RAM (SDRAM) may be used.

Hereinafter, operation of an embodiment will be described in detail with respect to FIG. 3. The aforementioned may be applied to numerous types of digital equipment, including, but not limited to an MP3 player, PDA, and PMP. However, merely for exemplary purposes and ease of discussion, an MP3 player will be discussed.

Figure 3:
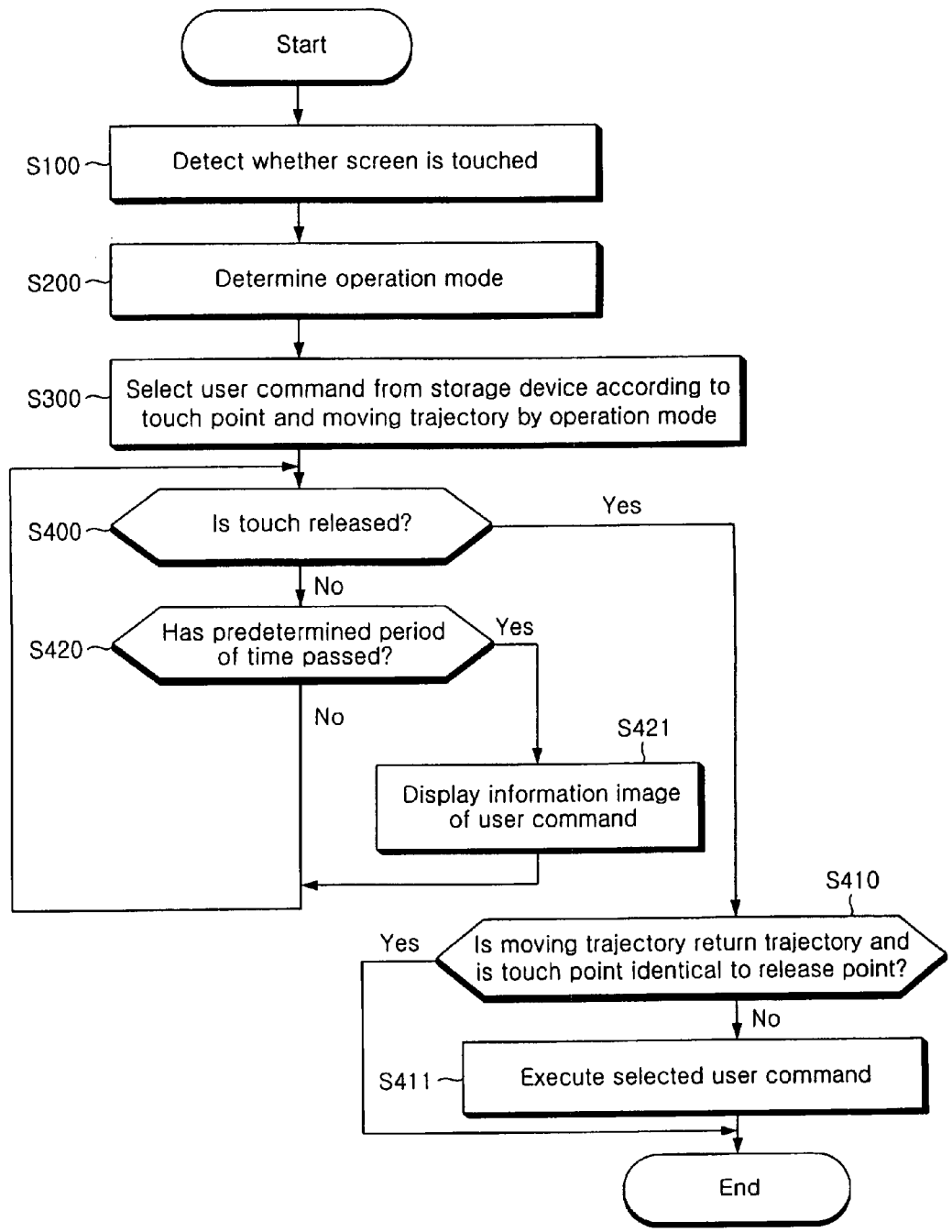
FIG. 3 is a flowchart of a method of operating the touch screen device shown in FIGS. 1 and 2, in accordance with an embodiment.

As shown in FIG. 3, a touch screen device in accordance with an embodiment may be operated by touching the detector 12 to input a command. The detector 12 may detect the touch, in step S100 and, further, the detector 12 may detect an initial touch point, a moving trajectory in a case where the touch point moves, and a point where the touch is released. Accordingly, the detector 12 detects information on the points and moving trajectory and transmits the information to the controller 20. The touch detected by the detector 12 may include any type of direct or indirect touch or contact using an appropriate touching implement, such as, for example, a finger, a stylus, and the like.

TABLE 1

| | <Play List Choice Mode> | | | |
| --- | --- | --- | --- | --- |
| | Speed | | | |
| Type | Under 1 S/Cm | 1-2 S/Cm | 2-4 S/Cm | Up 4 S/Cm |
| Transfer from the upper end on the right side to the lower end | Transfer play list downward at a speed of 1 S/Cm | Transfer play list downward at a speed of 2 S/Cm | Transfer play list downward at a speed of 4 S/Cm | Transfer play list downward at a speed of 5 S/Cm |
| Transfer from the lower end on the right side to the upper end | Transfer play list upward at a speed of 1 S/Cm | Transfer play list upward at a speed of 2 S/Cm | Transfer play list upward at a speed of 4 S/Cm | Transfer play list upward at a speed of 5 S/Cm |
| Transfer from the upper end on the left side to the lower end on the right side | | Skip play list within touch area | | |
| Transfer from the upper end on the right side to the lower end on the left side | | Delete play list within touch area | | |

A data storage device 36 for storing a variety of information, such as, for example, files, and in the example of a media player, MP3 files and the like, may be connected to the main controller 44. In certain embodiments, a NAND memory capable of rapidly and easily storing and reading out a large amount of information may be used as the data storage device 36. A portion of the data storage device 36 may be used as the user command storage device 35. However, a separate user command storage device 35 may be provided. For example, use of a user command storage device constructed of, for If the detector 12 detects a touch, the controller 20 may determine a current operation mode of the touch screen device, in step S200. The operation mode may be related to a state in which the touch screen device is currently operating, such as, for example, menu selection mode, playback mode, record mode, and other such operating modes. Accordingly, if the operation mode is detected, the associated images currently being displayed on the screen 10 are known. After determining the operation mode, the controller 20 may select a user command stored in the storage device 30 based on the operation mode and the points and moving trajectory, in step S300.

User commands may be classified by the operation mode and associated points and moving trajectory and then stored in the storage device 30. Examples of user commands which may be stored in the storage device 30 for the playback mode are shown in Table 2.

TABLE 2

< Playback Mode >

| Type of moving trajectories | User commands |
| --- | --- |
| ↑ | Volume up |
| ↓ | Volume down |
| — | Play back next music |
| ← | Play back previous music |
| ↑ | Skip 10 seconds |
| ↓ | Rewind 10 seconds |
| ↻ | Play |
| ↺ | Reverse |

Table 2 shows only a few exemplary user commands related to the types of operations which may be carried out in one particular exemplary operation mode. However, embodiments may further include a variety of moving trajectories and corresponding user commands in addition to the trajectories and user commands shown in Table 2. Further, the type of moving trajectory shown in Table 2 is shown in the same way as an actual moving trajectory displayed on the screen. However, the controller 20 may actually recognize the moving trajectory using a moving coordinate system.

Referring to Table 2, if the device is in the playback mode, the initial touch point is at a lower right portion of the screen 10, and the moving trajectory moves from the lower right portion to an upper right portion of the screen 10, the controller 20 may recognize the above action as a user command to turn up the volume as seen from Table 1 (see also FIGS. 3A and 3B). Thus, the controller 20 may increase the volume as the drag moves up the screen 10. Alternatively, the controller 20 may recognize the drag as a command to increase the volume, but may wait to execute the command until the touch is released. This option may be set as a user preference.

Figure 5A:
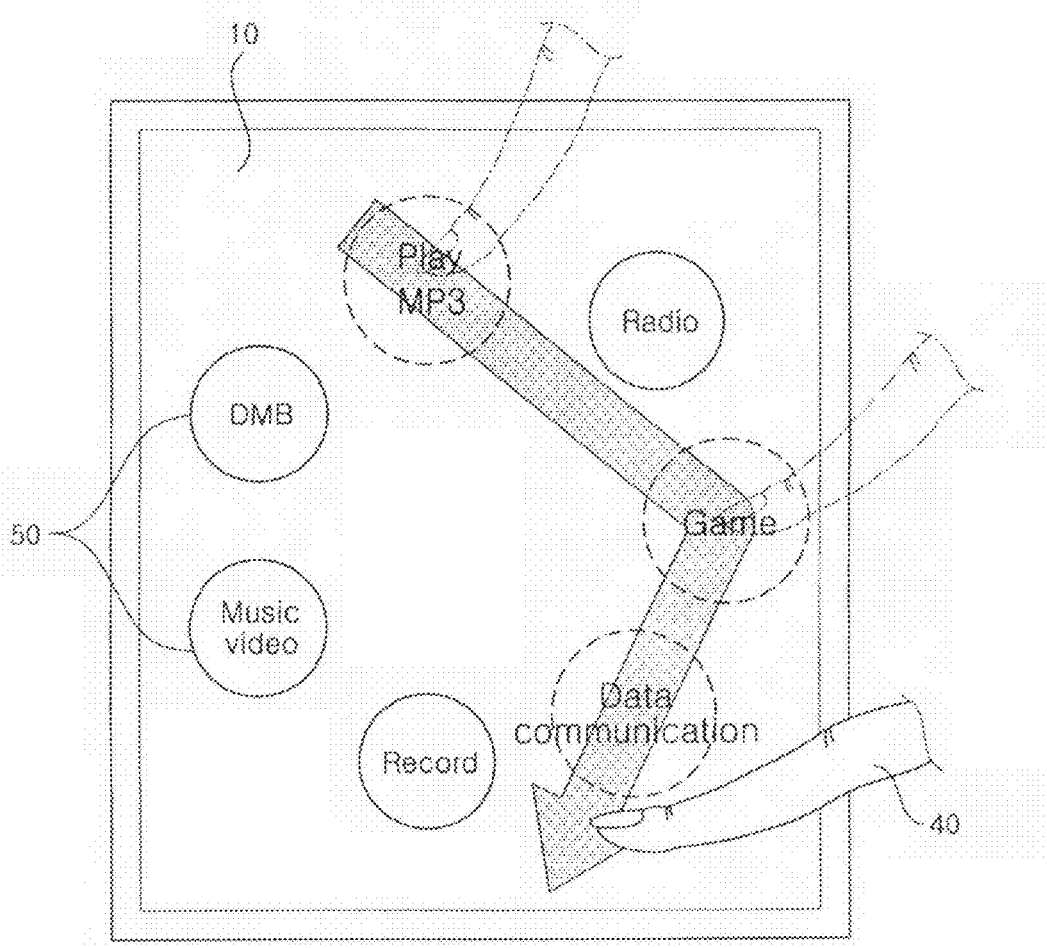
FIGS. 5A and 5B illustrate operation of the touch screen device shown in FIGS. 1 and 2 in a menu selection mode, in accordance with an embodiment.

In a different mode of operation, such as, for example, the menu selection mode, a user command may identify selection menus 50 positioned along a path of the moving trajectory and execute the selected menus. The menu selection mode may be a mode in which a list or the like is displayed for selection and execution of specific functions. Accordingly, as shown in FIG. 5A, if selection menus 50, such as, for example, "MP3 playback", "Game" and "Data communication" are positioned along a particular moving trajectory, the controller 20 may perform a data exchange with a host computer and also may execute a game such that a user can enjoy playing the game on the screen while also listening to a selected MP3 file through an earphone. The controller 20 may execute these selections sequentially, as they are touched along the moving trajectory, or these selections may be executed simultaneously upon release of the touch at the end of the moving trajectory. Again, these options may be set as user preferences.

If, for example, the selections are to be simultaneously executed, then after recognizing the user command, but before executing the user command, the controller 20 may determine whether the touch is released, in step S400. The touch screen device may recognize a user command when the detector 12 is touched, but may not execute the user command when the touch is released. When the touch is released, but before executing the user command, the controller 20 may determine whether the moving trajectory is a return trajectory in which the initial touch point is essentially the same as the release point, in step S410.

If the moving trajectory is a return trajectory and the initial touch point is essentially the same as the release point, the controller 20 may determine the touch and drag as an action to cancel an input entered, for example, by a user in error. In this instance, the controller 20 may not execute the determined user command, but instead await a new input. However, if the moving trajectory is not a return trajectory, and/or the initial touch point is not the same as the release point, the touch release may be determined to be normal and, the controller 20 may execute the determined command, in step S411.

In alternative embodiments, a user may cancel some, but not all, of the menus selected along the path of the moving trajectory. If, for example, a user touches "Play MP3" and "Game" and "Data Communication," as shown in FIG. 5A, but then decides that only "MP3" and "Game" should be executed, the user may simply return the touch to the "Game" icon before releasing the touch. This partial return trajectory allows a portion of the selected menus to be executed, while canceling any menus selected in error.

If the touch is not released, the controller 20 may determine whether a predetermined period of time has elapsed since the initial touch was detected on the screen, in step S420. If the touch is not released even after a predetermined period of time has elapsed, the controller 20 may determine that a request for additional information related to the user command has been made, and display a corresponding information image related to the user command, in step S421. Then, the controller 20 may again determine whether the touch is released, in step S400. If a predetermined period of time has not elapsed since the initial touch, the controller 20 may again determine whether the touch is released, and execute the user command only when the touch is released.

An example of the operation of embodiments so configured is illustrated in FIGS. 4A-4D, 5A and 5B. Operation of a touch screen device in the playback mode in accordance with an embodiment will be discussed with respect to FIGS. 4A-4D.

Figure 4A:
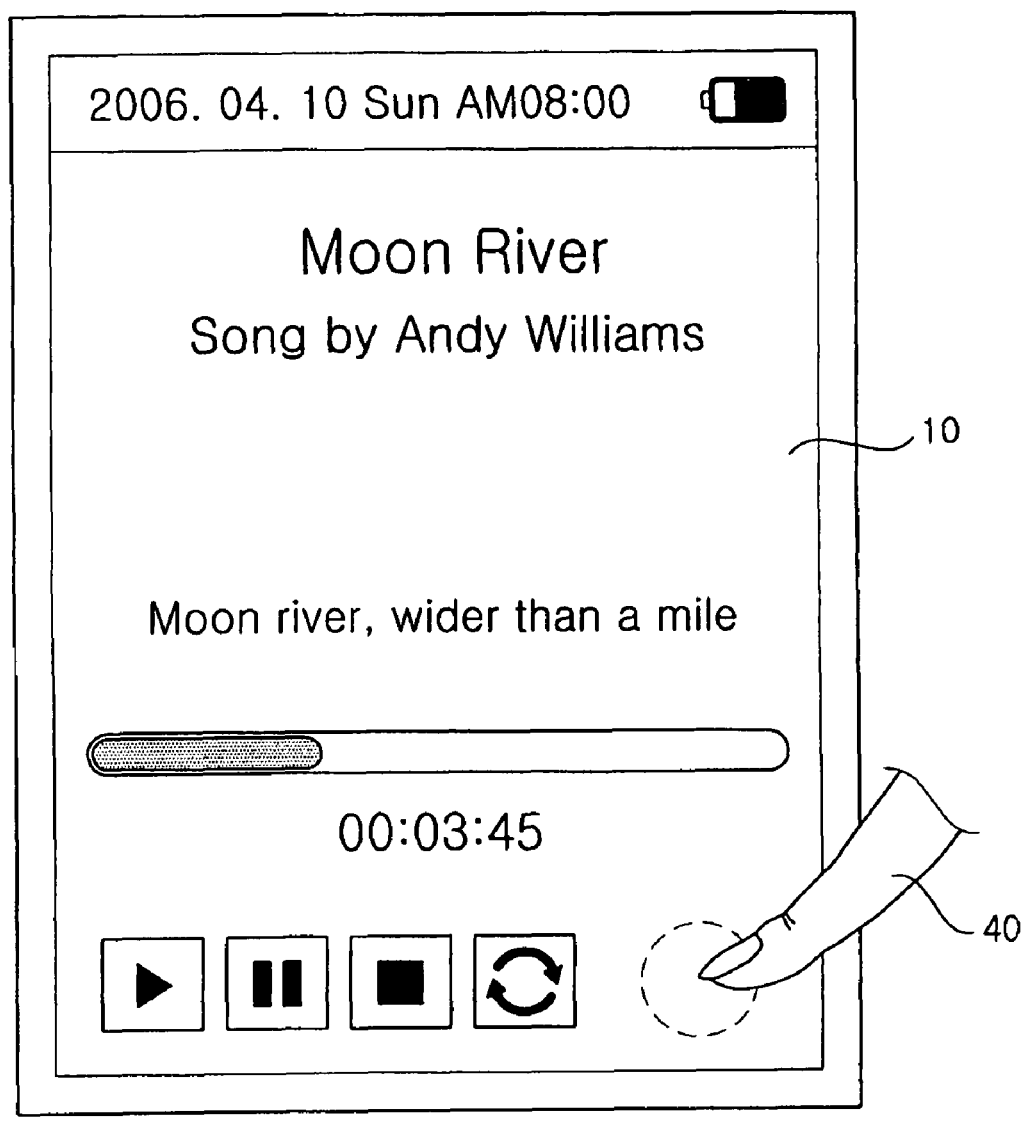
Figure 4B:
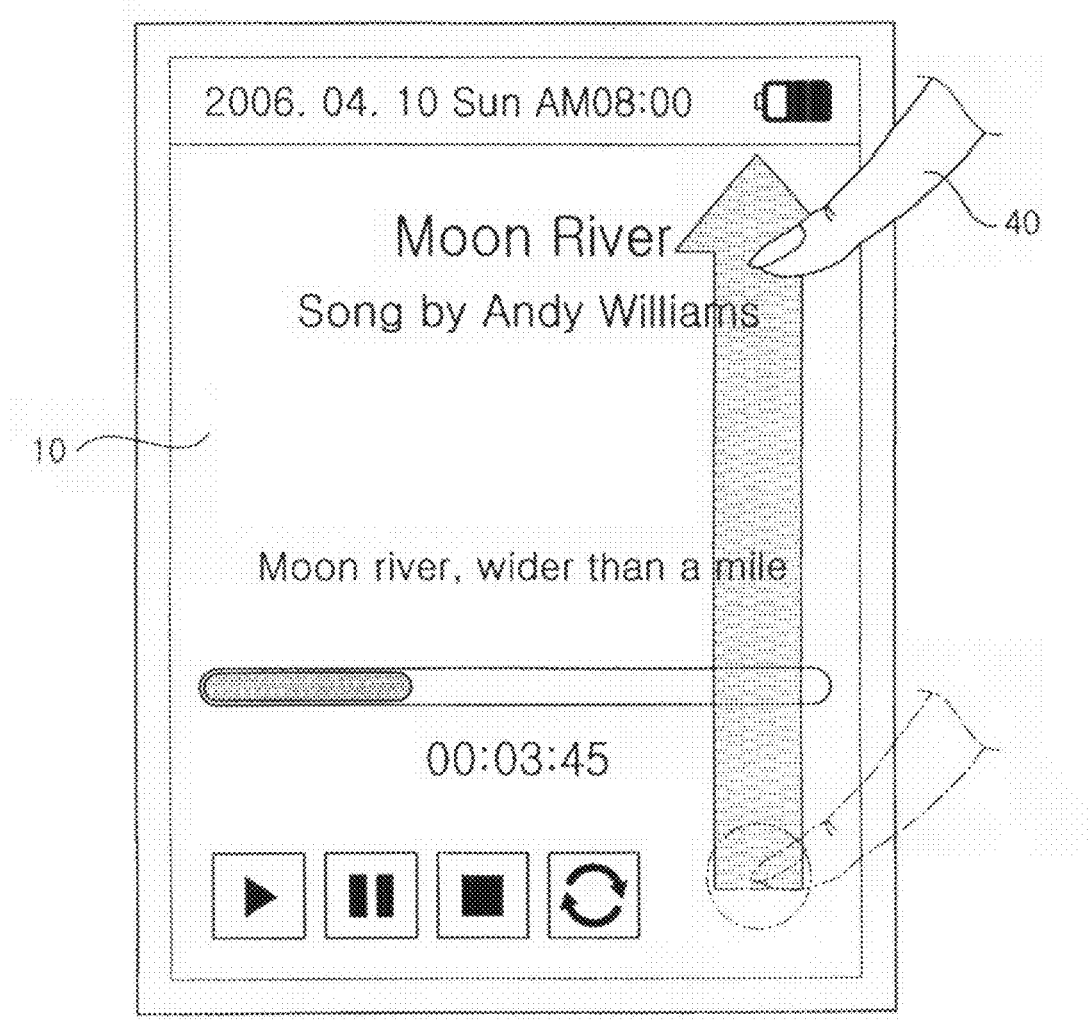

First, a user touches the screen 10 with a touching implement, such as, for example, a finger 40. Other touching implements, such as, for example, a stylus pen or the like may also be appropriate. As shown in FIG. 4A, the user touches one side of the screen 10 and upwardly moves the touch as shown in FIG. 4B. When the screen 10 is touched or the touch point is changed on the screen 10, the controller 20 may detect the touch and the change of the touch point and select a relevant user command. After selecting the user command, the controller 20 may stand by until the user releases the touch. As shown in FIG. 4C, the controller 20 may not execute the selected user command until the user releases the touch.

Figure 4D:
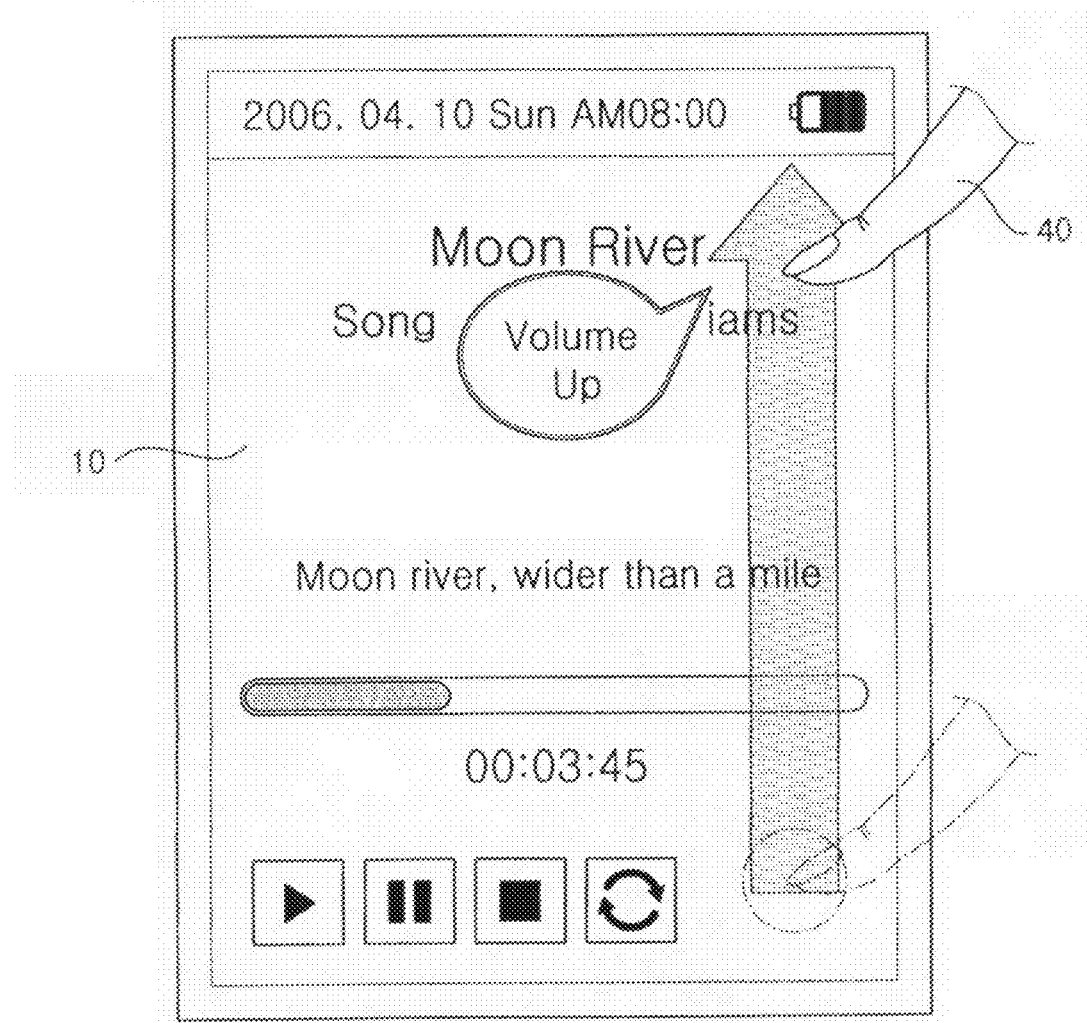

If the user does not release the touch even after the predetermined period of time has elapsed, the controller 20 may display additional information related to the user command indicated by the user's touch and the moving trajectory. In this example, the type of drag may correspond to a user command to turn up the volume as illustrated in Table 2, and thus, the controller 20 may display a corresponding information image such as "Volume Up," as shown in FIG. 4D.

Figure 4E:
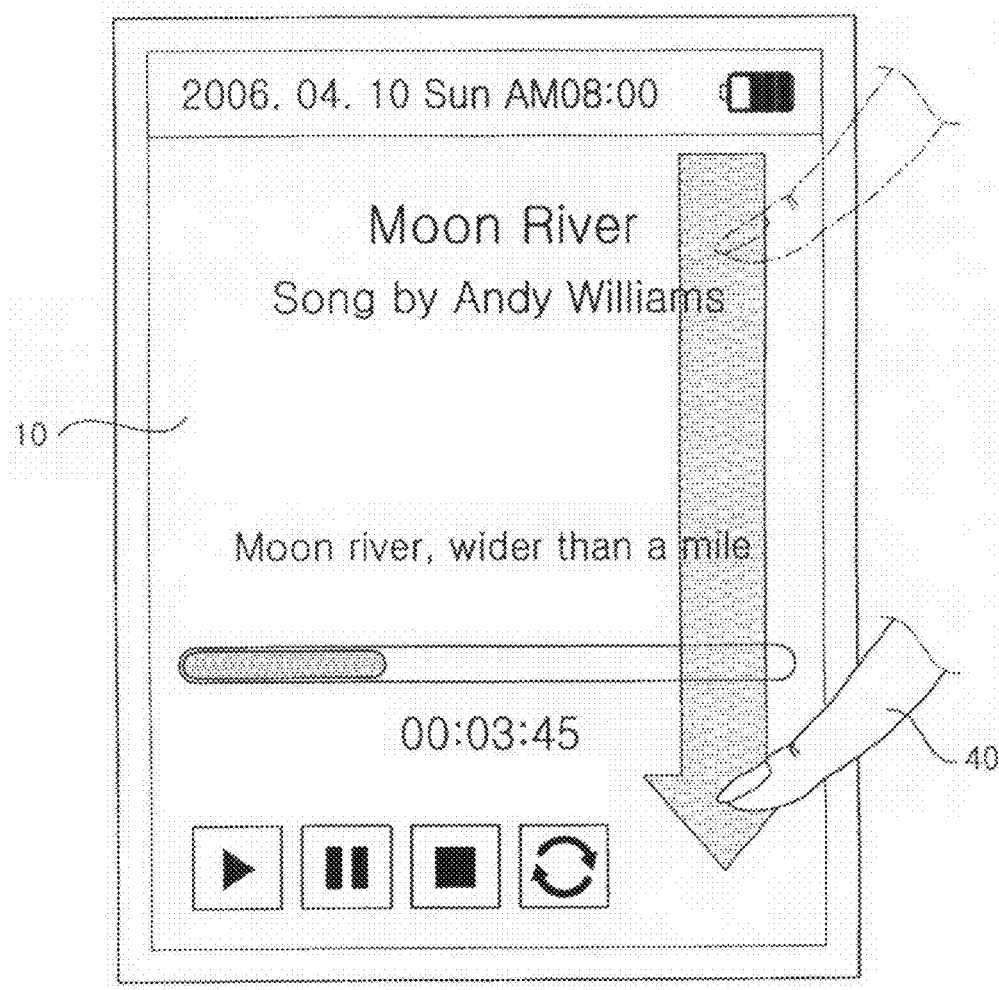

If the user releases the touch within the predetermined period of time, the controller 20 may simply execute the user command. However, before executing the user command, the controller 20 may examine whether the moving trajectory is a return trajectory and the touch release point is identical to the touch point. By returning to the original touch point, the user may cancel the user command. Therefore, if the user recognizes that an erroneous input has been made while performing the drag action on the detector 12, the user may merely return the drag trajectory to the initial touch point with the finger 40 still in contact with the detector 12, and then release the touch, as shown in FIG. 4E. Therefore, when the moving trajectory is a return trajectory and the release touch point is essentially the same as the initial touch point, the controller 20 may not execute the user command. If the moving trajectory does not draw a return trajectory and the touch is normally released as described above, the controller 20 may execute the selected user command.

Figure 5B:
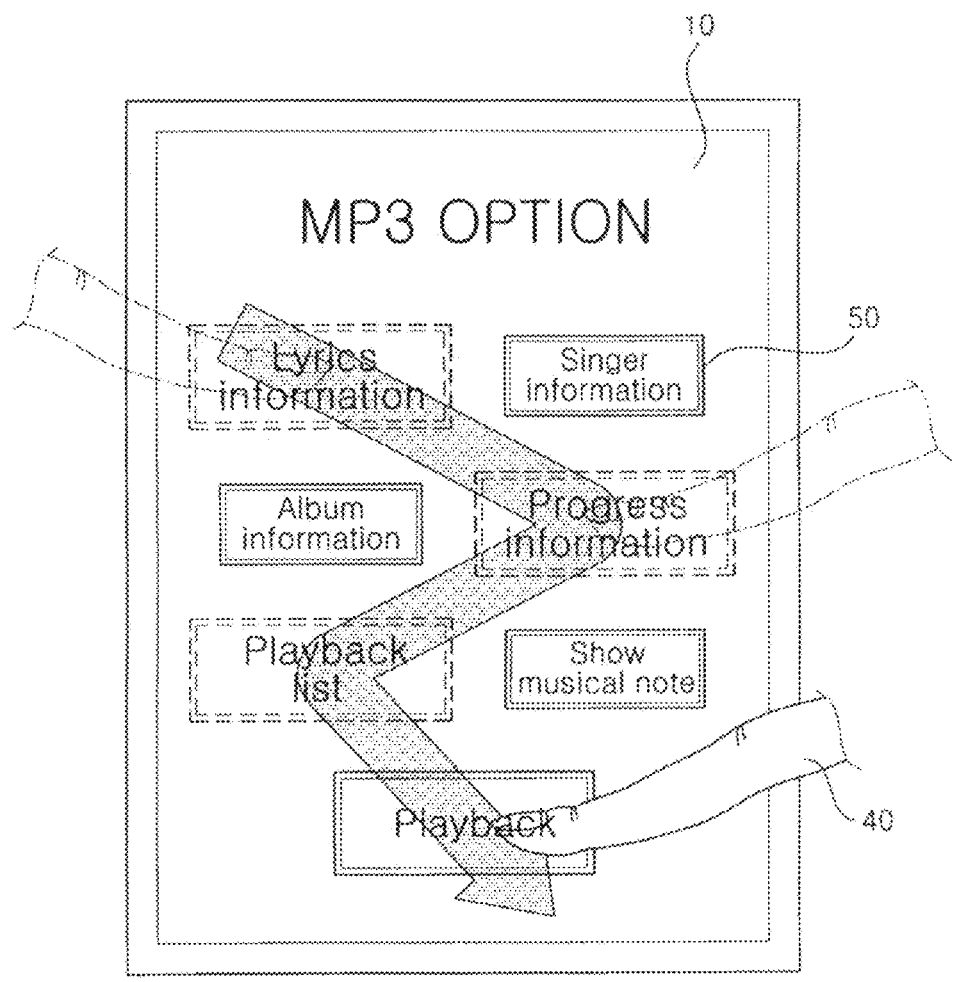

Operation of the digital equipment in the menu selection mode is shown in FIGS. 5A and 5B. The operating principle in the menu selection mode is the same as that in the playback mode, but methods of selecting user commands may be different. That is, the user command in the menu selection mode is to execute selection menus 50 existing along the path of the moving trajectory. Thus, as shown in FIG. 5A, if selection menus 50 such as "MP3 playback", "Game" and "Data communication" exist along the path of the moving trajectory, a command to simultaneously execute the three selection menus 50 may become a current user command.

Then, as shown in FIG. 5B, if the selection menus 50 such as "lyrics information", "progress information", and "playback list" exist along the path of the moving trajectory in a playback option selection mode, the user command may be to set a playback option such that lyrics, an image of the progress state, and a playback list are displayed when an MP3 file is played back. More specifically, the touch panel or detector controller 42 may signalize the touch point and movement of a touch and transfer the signal to the main controller 44. In this example, the touch type may include a moving trajectory of the touch. The main controller 44 may determine a touch type, that is, a touch trajectory, received from the touch panel or detector controller 42 and a position of a menu icon displayed on the display 14 in a playback option selection mode, and select all the menus at the points where the touch trajectory and menu icon position overlap each other. The main controller 44 may issue a user command to either sequentially or simultaneously execute the menus selected as such.

The selection menu 50 selected by the user's touch may be displayed in an enlarged state so that the user can easily recognize the selected menu. There are a variety of ways in which an appearance of the menu images may be changed. For example, if a plurality of menu images is selected, the selected menu images may be enlarged and displayed at the moment when a user's touch overlaps a particular menu image. Alternatively, selected menu images may be simultaneously enlarged and displayed after all the user's touches have been completed.

The operation modes and user commands described above are merely exemplary in nature, and it is well understood that numerous other operation modes and user commands may be set and stored in various ways.

Additionally, the various touch points and moving trajectories corresponding to the user commands may be defined by a user based on personal preferences. For example, menus for inputting touch points and moving trajectories corresponding to respective user commands are provided, and the user can input the touches corresponding to the user commands proposed to the user. Thus, the touches and moving trajectories input by the user can be stored and employed in such a way to correspond to the user commands.

A touch screen device and an operating method thereof in accordance with embodiments as embodied and broadly described herein may provide at least the following advantages.

A variety of user inputs may be performed according to the type of touching trajectories on the screen. Thus, it is not necessary to display all the menus on the screen. Therefore, the screen configuration may be simplified.

Further, since a variety of selection menus may be selected through a single drag, a user does not have to individually touch each menu in order to select more than one menu.

Still further, information on the user commands can be provided to a user, and cancelled, if necessary, before the selected user commands are executed. Therefore, it is possible to prevent an erroneous input from being executed.

The touch screen device in accordance with embodiments may be used in or formed as a display for electronic books, newspapers, magazines, and the like, different types of portable devices, such as, for example, handsets, MP3 players, notebook computers, and the like, audio applications, navigation applications, televisions, monitors, or other types of devices using a display, either monochrome or color.

Embodiments provide a touch screen device and an operating method thereof in which a variety of user commands may be executed based on predetermined touch trajectories. Further, embodiments provide a touch screen device and an operating method thereof in which a selection may be canceled before specific information is executed. The selection may be canceled even after the information has been selected on the touch screen. Furthermore, embodiments provide a touch screen device and an operating method thereof in which additional information related to a user command corresponding to the touch input is provided when a touch is input by a user.

In accordance with one embodiment broadly described herein, there is provided a method of operating a touch screen device, including detecting a touch point and a moving trajectory on a front surface of a screen, determining a user command based on the touch point and moving trajectory, detecting whether a touch is released, and executing the determined user command when the touch is released. The method may also include determining an operation mode of the screen. Further, the method may also include ignoring an input signal input through the touch screen if the moving trajectory is a return trajectory and the touch point is identical to a release point.

The method may also include displaying information on the user command if the touch is maintained for a predetermined period of time after the touch is detected on the screen. The user command may be classified in accordance with the touch point and moving trajectory and stored in a storage device. Further, the user command may be classified and stored in accordance with operation modes.

Additionally, when the touch point is positioned on a selection menu, an image of the selection menu may be enlarged and then displayed. Also, when one or more menus exist on the moving trajectory, the user command may be to simultaneously execute the selection menus on the moving trajectory. Further, the moving trajectory stored in the storage device to correspond to the user command may be a value defined by a user.

In accordance with another embodiment broadly described herein, there is provided a touch screen device, with a screen unit including a display unit for displaying information thereon and a detection unit for detecting a touch point, a moving trajectory and a touch release point on a screen, a storage unit for storing a user command corresponding to the touch point and moving trajectory, and a control unit for selecting the user command from the storage unit according to the touch point and moving trajectory and executing the selected command. In certain embodiments, the storage unit may store a user command corresponding to the touch point and moving trajectory according to an operation mode. Further, when one or more selection menus exist on the moving trajectory, the user command may be to simultaneously execute the selection menus on the moving trajectory.

In accordance with another embodiment broadly described herein, there is provided digital equipment mounted with a touch screen device, which is operated according to an operating method including detecting a touch point and a moving trajectory on a front surface of a screen, determining a user command based on the touch point and moving trajectory, detecting whether a touch is released, and executing the determined user command when the touch is released. In certain embodiments, the user command may be selected from user commands stored in a storage unit to correspond to the touch point and moving trajectory.

Since all the menus do not have to be displayed on the screen, the screen configuration is simple. Further, since a user can cancel the touching action and view the information on a user command to be executed during the touch input by the user, the convenience can be increased.

Further, an embodiment may be achieved in whole or in part by a method of operating a touch screen device, comprising detecting an initial touch point and a moving touch trajectory on a surface of a screen, determining a command based on the initial touch point and moving touch trajectory, detecting whether a touch is released, and executing the determined command when the touch is released. The initial touch point and moving touch trajectory may be detected on a front surface of the screen.

Further, the method may further comprise determining an operation mode of the screen. Additionally, the method may further include determining an operation mode of the screen is done before determining a command based on the initial touch point and moving touch trajectory. Also, the method may further comprise ignoring an input signal input through the screen if the moving touch trajectory is a return trajectory and the initial touch point is substantially the same as a release touch point.

Information related to the command may be displayed if the touch is maintained for a predetermined period of time after the initial touch is detected on the screen. The command may be classified in accordance with the initial touch point and moving touch trajectory and stored in a storage device. The command may further be classified and stored in accordance with an operation mode of the touch screen device.

Also, the method may further comprise enlarging and displaying an image of a selection menu when the touch is positioned on the selection menu. The enlarged image of a selection menu may be displayed if the touch is held on the selection menu for a predetermined amount of time. The method may comprise, when one or more menus are positioned along a path of the moving touch trajectory, simultaneously or sequentially executing the one or more menus positioned along the path of the moving touch trajectory. A command corresponding to a moving touch trajectory may be defined by a user.

An embodiment may be further achieved in whole or in part by a touch screen device, comprising a screen including a display configured to display information thereon and a detector configured to detect an initial touch point, a moving touch trajectory and a touch release point on the display, a storage device configured to store a command corresponding to the initial touch point and moving touch trajectory, and a controller configured to select a command from the storage device based on the detected initial touch point and moving touch trajectory, and to execute the selected command. The storage device may be configured to store a command corresponding to the initial touch point and the moving trajectory based on an operation mode of the touch screen device. When one or more selection menus are positioned along a path of the moving touch trajectory, the command associated with the moving touch trajectory may be to simultaneously or sequentially execute the one or more selection menus positioned along the path of the moving touch trajectory.

The controller may be configured to execute the selected command after the release touch point is detected by the detector. The selected command may be a command to do nothing if the moving touch trajectory is a return trajectory in which the touch release point is substantially the same as the initial touch point.

Digital equipment may comprise the touch screen device. The digital equipment may be an MP3 player, a PMP, a PDA, a notebook computer, a mobile communication terminal, or a portable navigation system. An embodiment may be further achieved in whole or in part by digital equipment provided with a touch screen device, the device being operated according to an operating method comprising detecting a touch point and a moving trajectory on a surface of a screen, determining a command based on the touch point and moving trajectory, detecting whether a touch is released, and executing the determined command when the touch is released.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A method of operating a touch screen device equipped with a touch screen capable of displaying at least one icon thereon, the method comprising:
   detecting an initial touch point and a moving touch trajectory on the touch screen;
   determining a command based on the initial touch point and moving touch trajectory;
   detecting whether a touch associated with the moving touch trajectory is released;
   executing the determined command associated with the moving touch trajectory after the touch associated with the moving touch trajectory is released when there is no icon displayed at the initial touch point; and
   displaying information related to the command associated with the initial touch point and the moving touch trajectory if the touch has not been released after a predetermined period of time has elapsed, wherein different information related to the command is displayed depending on the initial touch point and the moving touch trajectory.

2. The method of claim 1, wherein there is no icon moving along the moving touch trajectory during the touch.

3. The method of claim 1, further comprising determining an operation mode of the touch screen device.

4. The method of claim 3, wherein determining an operation mode of the touch screen device is done before determining a command based on the initial touch point and moving touch trajectory.

5. The method of claim 3, further comprising ignoring an input signal inputted through the touch screen if the moving touch trajectory is a return trajectory and the initial touch point is substantially the same as a touch release point.

6. The method of claim 5, further comprising enlarging and displaying an image of a selection menu icon when the touch is positioned on the selection menu icon.

7. The method of claim 6, wherein the enlarged image of the selection menu icon is displayed if the touch is held on the selection menu icon for a predetermined amount of time.

8. The method of claim 1, wherein the command is classified in accordance with the initial touch point and moving touch trajectory and stored in a storage device.

9. The method of claim 8, wherein the command is classified and stored in accordance with the operation mode of the touch screen device.

10. The method of claim 1, further comprising, when one or more menu icons are positioned along a path of the moving touch trajectory, simultaneously or sequentially executing one or more menus corresponding to the one or more menu icons positioned along the path of the moving touch trajectory.

11. The method of claim 10, wherein a command corresponding to a moving touch trajectory is defined by a user.

12. A touch screen device, comprising:
   a touch screen configured to display at least one icon thereon and to detect an initial touch point and a moving touch trajectory on the touch screen;
   a storage device configured to store a command corresponding to the initial touch point and moving touch trajectory; and
   a controller configured to select a command from the storage device based on the detected initial touch point and moving touch trajectory, and to execute the selected command associated with the moving touch trajectory after a touch associated with the moving touch trajectory is released when there is no icon displayed at the initial touch point,
   wherein the controller is further configured to display information related to the command associated with the initial touch point and the moving touch trajectory if the touch has not been released after a predetermined period of time has elapsed, and wherein different information related to the command is displayed depending on the initial touch point and the moving touch trajectory.

13. The device of claim 12, wherein the storage device is configured to store a command corresponding to the initial touch point and the moving trajectory based on an operation mode of the touch screen device.

14. The device of claim 13, wherein when one or more selection menu icons are positioned along a path of the moving touch trajectory, the command associated with the moving touch trajectory is to simultaneously or sequentially execute one or more selection menus corresponding to the one or more menu icons positioned along the path of the moving touch trajectory.

15. The device of claim 12, wherein the controller is configured to display no icon moving along the moving touch trajectory during the touch.

16. The device of claim 15, wherein the selected command is a command to do nothing if the moving touch trajectory is a return trajectory in which a touch release point is substantially the same as the initial touch point.

17. Digital equipment comprising the touch screen device of claim 12.

18. The device of claim 17, wherein the digital equipment is an MP3 player, a PMP, a PDA, a notebook computer, a mobile telephone, or a portable navigation terminal.

* * * * *